US010038949B1

(12) United States Patent
Chen

(10) Patent No.: US 10,038,949 B1
(45) Date of Patent: Jul. 31, 2018

(54) REMOTE SURVEILLANCE COMPOSITE MACHINE

(71) Applicant: Way-Hong Chen, Taipei (TW)

(72) Inventor: Way-Hong Chen, Taipei (TW)

( * ) Notice: Subject to any disclaimer, the term of this patent is extended or adjusted under 35 U.S.C. 154(b) by 2 days.

(21) Appl. No.: 15/401,153

(22) Filed: Jan. 9, 2017

(51) Int. Cl.
*H04W 4/22* (2009.01)
*H04R 1/08* (2006.01)
*A47D 15/00* (2006.01)
*G06F 3/16* (2006.01)

(52) U.S. Cl.
CPC ............. *H04R 1/083* (2013.01); *A47D 15/00* (2013.01); *G06F 3/165* (2013.01); *H04R 2420/09* (2013.01)

(58) Field of Classification Search
CPC ............. B60D 1/36; B60D 1/58; H04N 7/183
USPC ........................... 381/56, 58; 455/404.2, 420
See application file for complete search history.

(56) References Cited

U.S. PATENT DOCUMENTS

2010/0244765 A1* 9/2010 Collopy ................ G06F 1/1624 320/103

* cited by examiner

*Primary Examiner* — George C Monikang
(74) *Attorney, Agent, or Firm* — Alan D. Kamrath; Kamrath IP Lawfirm, P.A.

(57) ABSTRACT

A remote surveillance composite machine includes a primary device and a secondary device wirelessly connected with and driven by the primary device. The secondary device includes a housing provided with a recess, a pivot member and a locking member. The secondary device is used individually or connected with a hanging arm which is mounted on a baby playpen. The hanging arm has a distal end provided with a pivot hole and a locking hole. The recess is mounted on the distal end of the hanging arm. The pivot member is connected with the pivot hole. The locking member is locked in the locking hole. Thus, the secondary device is mounted on the distal end of the hanging arm and is located above the playpen to face the baby.

3 Claims, 4 Drawing Sheets

REMOTE SURVEILLANCE COMPOSITE MACHINE

BACKGROUND OF THE INVENTION

1. Field of the Invention

The present invention relates to a composite machine and, more particularly, to a remote surveillance composite machine for monitoring babies in a remote control manner.

2. Description of the Related Art

A hanging arm is mounted on a baby playpen for hanging articles, such as dolls, toys and the like, so as to provide an amusement effect to the baby stayed in the playpen. The hanging arm also has a surveillance function for monitoring the baby in the playpen. The hanging arm has to match the rails of the playpen and has to suspend the articles so that the hanging arm is designed to have a larger size. However, the hanging arm has a large size so that it cannot be removed easily and used individually to perform the monitoring function.

BRIEF SUMMARY OF THE INVENTION

The primary objective of the present invention is to provide a remote surveillance composite machine that is used for monitoring babies in a remote control manner.

In accordance with the present invention, there is provided a remote surveillance composite machine comprising a primary device and a secondary device wirelessly connected with and driven by the primary device. The secondary device includes a housing, a switch mounted on the housing, and a voice transponder mounted on the housing. The housing of the secondary device has a bottom provided with a recess. The housing of the secondary device has a periphery provided with a pivot member located in the recess and a locking member located in the recess. The pivot member of the secondary device is connected electrically with the switch and the voice transponder. The housing of the secondary device has a surface provided with a charging slot which is connected electrically with the switch and the voice transponder. The secondary device is used individually or connected with a hanging arm which is mounted on a baby playpen. The hanging arm has a distal end provided with a pivot hole and a locking hole. The recess of the secondary device is mounted on the distal end of the hanging arm. The pivot member of the secondary device is connected with the pivot hole of the hanging arm. The locking member of the secondary device is locked in the locking hole of the hanging arm.

According to the primary advantage of the present invention, the secondary device is used individually or connected with the hanging arm so that the remote surveillance composite machine is used for monitoring babies in a remote control manner.

According to another advantage of the present invention, the secondary device is mounted on and removed from the hanging arm easily and quickly, thereby facilitating the user mounting and detaching the remote surveillance composite machine.

According to a further advantage of the present invention, the secondary device is mounted on the distal end of the hanging arm, so that the secondary device is located above the playpen and faces the baby exactly, thereby facilitating the watcher monitoring the baby.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
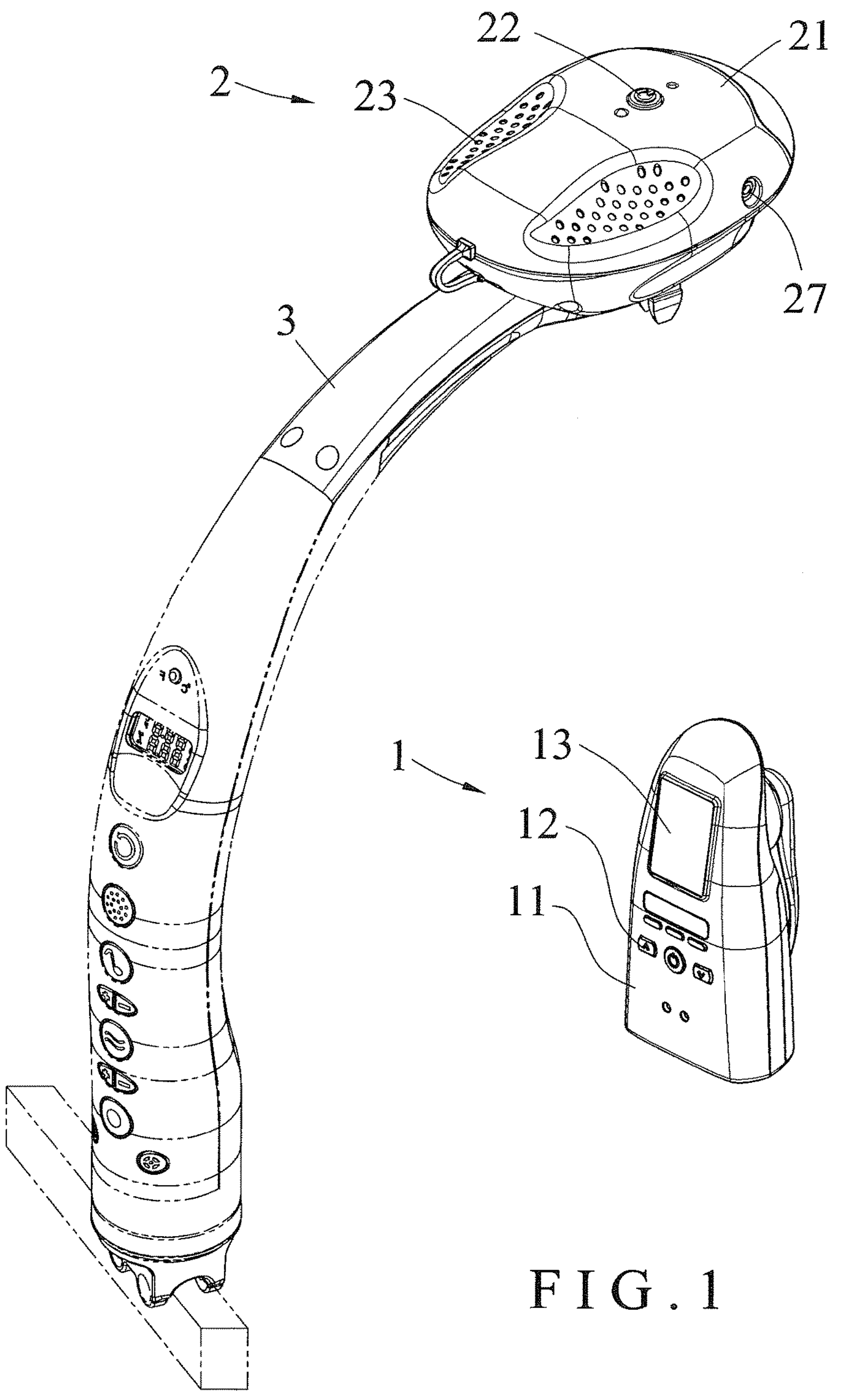
FIG. 1 is a perspective view of a remote surveillance composite machine in accordance with the preferred embodiment of the present invention.
Figure 2:
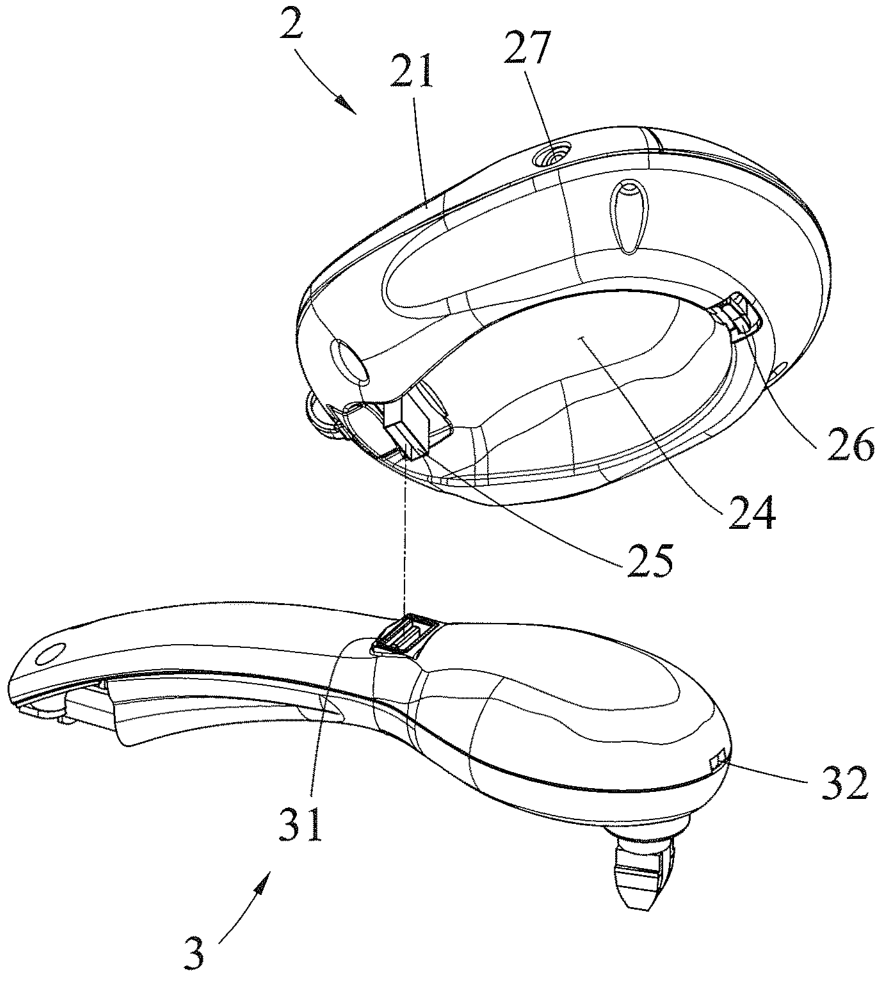
FIG. 2 is a partially exploded perspective view of the remote surveillance composite machine in accordance with the preferred embodiment of the present invention.
Figure 3:
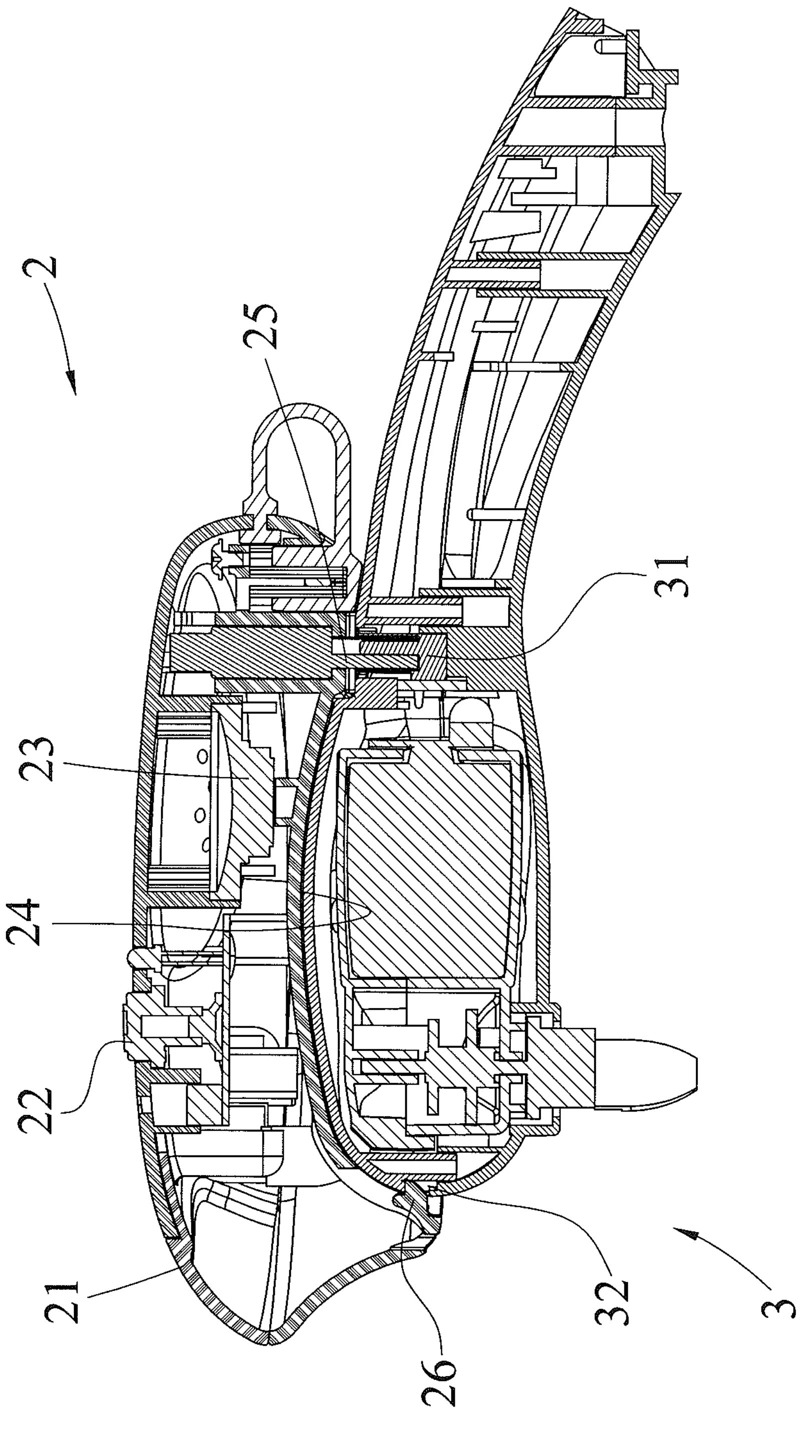
FIG. 3 is a partially cross-sectional view of the remote surveillance composite machine in accordance with the preferred embodiment of the present invention.

Referring to the drawings and initially to FIGS. 1-3, a remote surveillance composite machine in accordance with the preferred embodiment of the present invention comprises a primary device 1 and a secondary device 2 wirelessly connected with and driven by the primary device 1.

The primary device 1 includes a casing 11, a control button module 12 mounted on the casing 11, and a panel 13 mounted on the casing 11. The control button module 12 and the panel 13 are used to control the secondary device 2.

The secondary device 2 includes a housing 21, a switch 22 mounted on the housing 21, and a voice transponder 23 mounted on the housing 21. The housing 21 of the secondary device 2 has an interior provided with a circuit board connected with the voice transponder 23 to transmit and receive the voice of a baby so that the secondary device 2 can transmit and receive the voice. The housing 21 of the secondary device 2 has a bottom provided with a recess 24. The housing 21 of the secondary device 2 has a periphery provided with a pivot member 25 located in the recess 24 and a locking member 26 located in the recess 24. The pivot member 25 of the secondary device 2 is connected electrically with the switch 22 and the voice transponder 23 and is connected electrically with the circuit board. The housing 21 of the secondary device 2 has a surface provided with a charging slot 27 which is connected electrically with the switch 22 and the voice transponder 23 and is connected electrically with the circuit board.

The secondary device 2 is used individually or connected with a hanging arm 3 which is mounted on a baby playpen. The hanging arm 3 has a distal end provided with a pivot hole 31 and a locking hole 32. The recess 24 of the secondary device 2 is mounted on the distal end of the hanging arm 3. The pivot member 25 of the secondary device 2 is connected with the pivot hole 31 of the hanging arm 3. The locking member 26 of the secondary device 2 is locked in the locking hole 32 of the hanging arm 3.

In the preferred embodiment of the present invention, the pivot member 25 of the secondary device 2 uses a USB adapter. In addition, the pivot member 25 and the locking member 26 of the secondary device 2 are located at two opposite ends of the recess 24.

In assembly, when the recess 24 of the secondary device 2 is mounted on the distal end of the hanging arm 3, the pivot member 25 of the secondary device 2 is connected with the pivot hole 31 of the hanging arm 3, and the locking member 26 of the secondary device 2 is locked in the locking hole 32 of the hanging arm 3, so that the secondary device 2 is mounted on the distal end of the hanging arm 3. In such a manner, the USB adapter of the pivot member 25 is electrically connected with an internal power supply of the hanging arm 3, so that the internal power supply of the hanging arm 3 provides an electric power to the secondary device 2.

Figure 4:
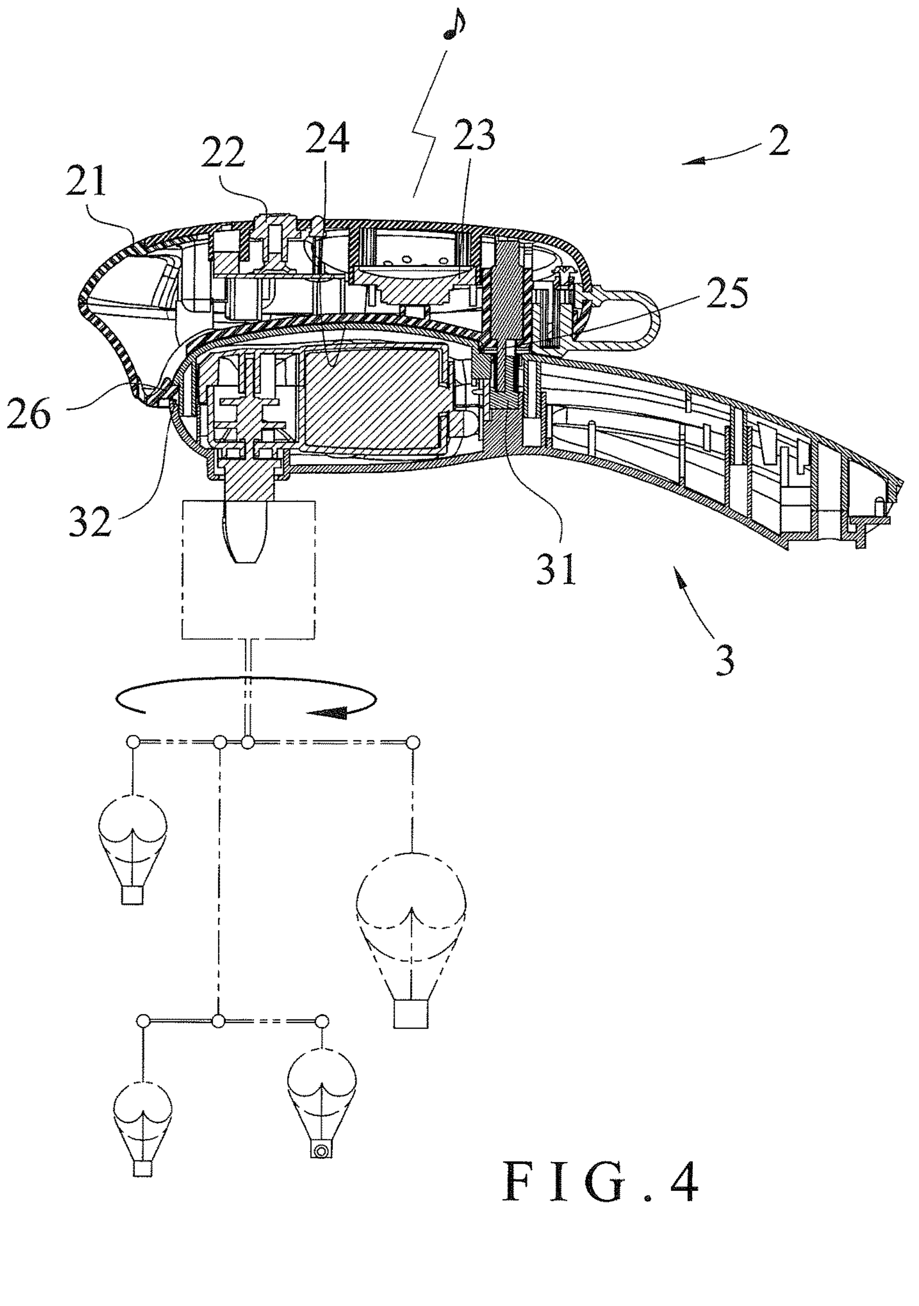
FIG. 4 is a schematic operational view of the remote surveillance composite machine as shown in FIG. 3 in use.

In operation, referring to FIG. 4 with reference to FIGS. 1-3, after the switch 22 of the secondary device 2 is started, the secondary device 2 is connected wirelessly with the primary device 1, so that the primary device 1 can control and operate the secondary device 2 to monitor the baby stayed in the playpen. At this time, the secondary device 2 is mounted on the distal end of the hanging arm 3, so that the secondary device 2 is located above the playpen and faces the baby exactly, thereby facilitating the watcher monitoring the baby stayed in the playpen. Alternatively, the secondary device 2 is removed from the hanging arm 3 so that the secondary device 2 is used individually. In such a manner, when the secondary device 2 is used individually, the charging slot 27 of the secondary device 2 is connected with a charging line to provide a charging function.

Accordingly, the secondary device 2 is used individually or connected with the hanging arm 3 so that the remote surveillance composite machine is used for monitoring babies in a remote control manner. In addition, the secondary device 2 is mounted on and removed from the hanging arm 3 easily and quickly, thereby facilitating the user mounting and detaching the remote surveillance composite machine. Further, the secondary device 2 is mounted on the distal end of the hanging arm 3, so that the secondary device 2 is located above the playpen and faces the baby exactly, thereby facilitating the watcher monitoring the baby.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A remote surveillance composite machine comprising:
a primary device; and
a secondary device wirelessly connected with and driven by the primary device;
wherein:
the secondary device does not directly contact the primary device;
the secondary device includes:
a housing;
a switch mounted on the housing; and
a voice transponder mounted on the housing to transmit and receive a voice;
the housing of the secondary device has a bottom provided with a recess;
the housing of the secondary device has a periphery provided with a pivot member located in the recess and a locking member located in the recess;
the pivot member of the secondary device is connected electrically with the switch and the voice transponder;
the housing of the secondary device has a surface provided with a charging slot which is connected electrically with the switch and the voice transponder;
the secondary device is secured on a hanging arm which is mounted on a baby playpen;
the primary device monitors a condition of the baby playpen through the secondary device;
the hanging arm has a distal end provided with a pivot hole and a locking hole;
the recess of the secondary device is mounted on and receives the distal end of the hanging arm;
the pivot member of the secondary device is connected with the pivot hole of the hanging arm; and
the locking member of the secondary device is locked in the locking hole of the hanging arm.

2. The remote surveillance composite machine of claim 1, wherein the pivot member of the secondary device uses a USB adapter.

3. The remote surveillance composite machine of claim 1, wherein the pivot member and the locking member of the secondary device are located at two opposite ends of the recess.

* * * * *